Sept. 14, 1926.
G. D. HECK
TUBE OR PIPE COUPLING
Filed Sept. 16, 1921
1,599,998
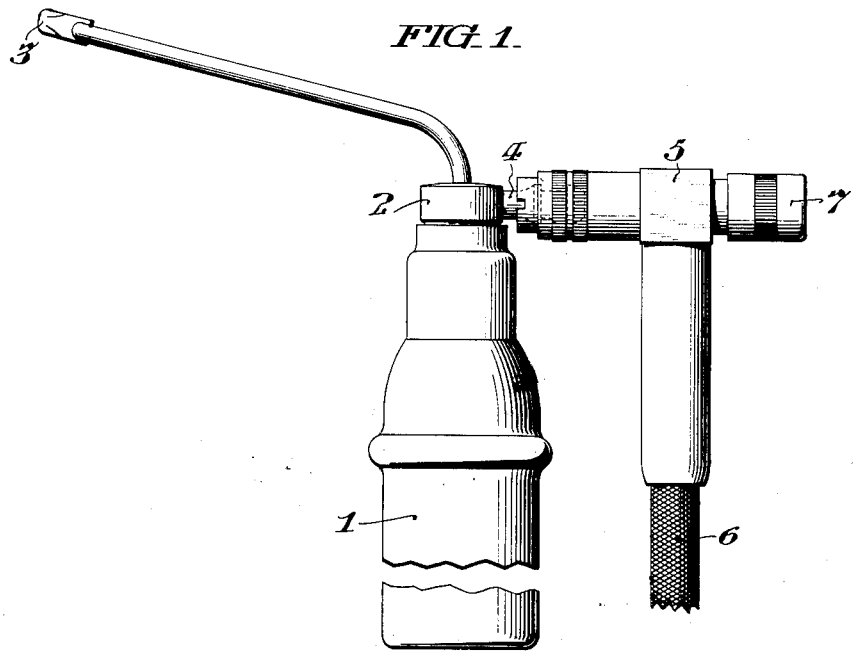
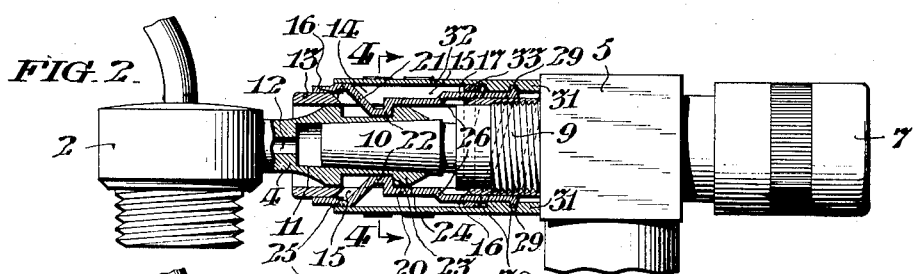
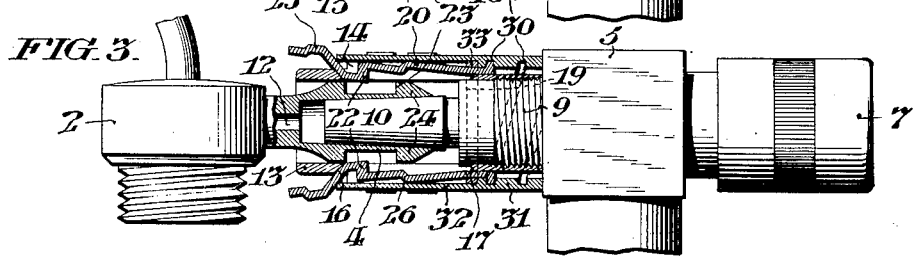
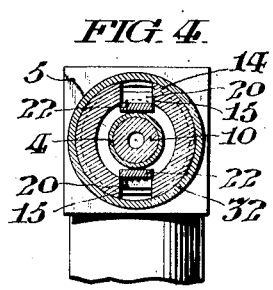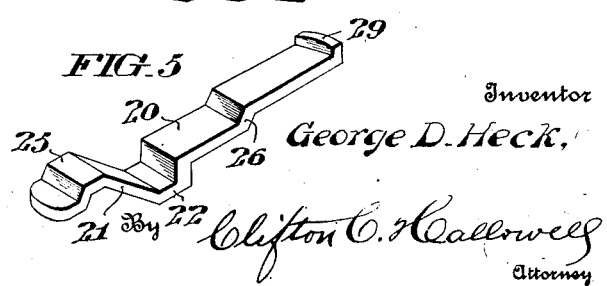
Inventor
George D. Heck,
By Clifton C. Callwell
Attorney Patented Sept. 14, 1926.

1,599,998

UNITED STATES PATENT OFFICE.

GEORGE D. HECK, OF PRINCE BAY, NEW YORK, ASSIGNOR TO THE S. S. WHITE DENTAL MANUFACTURING COMPANY, A CORPORATION OF PENNSYLVANIA.

TUBE OR PIPE COUPLING.

Application filed September 16, 1921. Serial No. 501,108.

My invention relates particularly to that class of couplings that may be employed to connect a tube, pipe, nozzle, valve or other device with conveyers, receivers, dispensers, etc., and is especially directed to a coupling adapted to connect air-conveying means with a spray-bottle, chip-blower or other device.

The principal objects of my invention are to provide a spray-bottle valve with an efficient coupling capable of being readily connected with and removed from the nipple of a spray-bottle, chip-blower or other device, and to mechanically hold it in such swiveled relation therewith as to prevent accidental relative separation of the connected parts, and to afford an absolutely leak-tight joint therebetween.

Other objects of my invention are to provide a coupling with gripping means adjustable to compensate for any inequalities that may be inherent in the connected member and to engage said connected member with any desired degree of tension.

Specifically stated the form of my invention as hereinafter described comprehends a coupling having a slotted ferrule arranged to be engaged with, and project from, the outlet branch, nipple or nozzle of a spray-bottle valve, gripping fingers arranged to be moved longitudinally in the slots in said ferrule, and guided thereby to engage and disengage the nipple of a spray bottle, with said branch, nipple, or nozzle of the spray-bottle valve, by a sleeve rotatably mounted on said ferrule, and having helical grooves with which said fingers cooperate, and by which their actuation is effected to grip and release the nipple of said spray-bottle.

My invention further includes all of the various novel features of construction and arrangement as hereinafter more definitely specified.

In the accompanying drawings, Figure 1 is a side elevational view showing a convenient application of the coupling, in connecting a spray-bottle and a spray-bottle valve; Fig. 2 is an enlarged central longitudinal sectional view of the coupling as applied in Fig. 1; Fig. 3 is an enlarged central longitudinal sectional view similar to Fig. 2, but showing the gripping-fingers in their releasing position; Fig. 4 is a transverse vertical sectional view of said coupling, taken on the line 4—4 in Fig. 2, and Fig. 5 is a perspective view of one of the gripping fingers.

In said figures the spray bottle 1 which is of well known construction has the screw-cap 2, spray nozzle 3 and union-nipple 4 arranged to be removably coupled with the spray-bottle valve comprising the body 5 which is connected with any suitable compressed air supply by the pipe or tube 6, and controlled by the plunger head 7.

As best shown in Fig. 2 the valve body 5—65 is provided with the threaded boss 9 terminating in the union nozzle 10 which is tapered to fit the taper of the socket 11, communicating with the passageway 12 in the union-nipple 4.

The threaded boss 9 is arranged to receive the ferrule 13, which is engaged in threaded relation therewith, and which is formed intermediate of its ends with an annular enlargement 14, and is provided with diametrically opposite slots 15, whose side walls are substantially parallel and whose end walls diverge outwardly, the forward wall 16 serving as a guide and the rearward wall 17 serving as an abutment to be hereinafter described.

The union-nipple 4 and union-nozzle 10 are arranged to be engaged and held in coupled relation by the grippers or gripping-fingers 20 which are mounted to slide longitudinally in the slots 15, and comprise strips of flat material, preferably metal, shaped as best shown in Fig. 2 of the drawings, with the obliquely bent portion 21 forming the inwardly directed hump 22, arranged to engage the shoulder 23 of the head 24 of the nipple 4, and the outwardly directed hump 25. The grippers 20 are also bent to provide the offset 26 which is arranged to engage the abutment 17 to limit the rearward movement of said grippers.

Each of said gripping-fingers 20 has its rear end outwardly extended to form the actuating lug 29, which is arranged to extend into and cooperate with the helical grooves 30 in the internal thickened rear portion 31 of the sleeve 32, which is rotatable about the ferrule 13 to produce a longitudinal or axial movement of the gripping-fingers 20 and thereby effect the engagement or release of the union-nipple 4 from the union-nozzle 10, it being obvious that the rotation of the sleeve 32 in one direction effects the movement of the gripping-fingers 20 inwardly to force the union-nipple 4 into leak-tight engagement with the union-nozzle 10, and that the reverse rotation of said sleeve 32 effects an outward movement of the gripping-fingers 20 to release said parts.

It will be readily seen that when the obliquely inclined portion 21 engages the inclined walls 16 of the slots 15, said gripping-fingers are guided thereby radially outward in a divergent path as well as axially forward, so as to withdraw the hump 22 laterally, sufficiently to permit the head 24 of the nipple 4 to be withdrawn.

As shown in Figs. 2 and 3 the gripping-fingers 20 are embraced by the annular band 33 which encircles the ferrule 13 between the internally thickened portion 31 of the sleeve 32, and the annular enlargement 14 on the ferrule 13, and tends to retain the gripping-fingers 20 in their proper relation.

It may be here noted that the sleeve 32 is extended forwardly sufficiently to embrace the hump 25 of the gripping fingers 20 and thereby prevent accidental lateral displacement of said gripping-fingers while in position to engage union-nipple 4 with the union-nozzle 10 as shown in Fig. 2.

The outward movement of the gripping-fingers 20 from the position shown in Fig. 2 is effected by rotation of the sleeve 32, and the annular band 33 tends to maintain the movement of said gripping-fingers in a lineal direction, however, when such lineal movement of the gripping fingers is sufficient to engage the inclined portion 21 with the guide 16, and further movement outwardly causes said fingers to ride obliquely outward in relatively divergent relation and thereby be distorted sufficiently to permit the hump 22 thereon to clear the path of the head 24 of the union nipple 4, said fingers being all the while held by the annular band 33 engaged with the guiding surface 16 as shown in Fig. 3.

It will be obvious that any desired degree of tension may be brought to bear between the union-nipple 4 and the union-nozzle 10 by rotation of the sleeve 32 without destroying the swiveled relation between said parts, and that an absolutely leak-tight joint may be thereby afforded.

I do not desire to limit my invention to the precise details of construction and arrangement as herein set forth, as it is obvious that various modifications may be made therein without departing from the essential features of my invention as defined in the appended claims.

Having thus described my invention, I claim:—

1. A coupling of the class described, comprising a hollow body, grippers movable axially with respect thereto and cooperative therewith to effect their radial movement, and a sleeve surrounding said grippers, rotatable about said hollow body and having helical grooves therein with which said grippers cooperate to effect their actuation.

2. A coupling of the class described comprising a hollow body having slots therein, gripping fingers guided by said slots, movable longitudinally with respect to said body and cooperative with the walls of said slots to effect their relatively divergent movement, and a sleeve rotatable about said hollow body and having internal grooves with which said gripping fingers cooperate to effect their reciprocatory actuation.

3. A coupling of the class described, comprising a hollow body having slots therein, gripping-fingers guided by said slots, movable longitudinally with respect to said body and cooperative with the walls of said slots to effect their relatively divergent movement, means tending to maintain said gripping-fingers in parallel relation, and means surrounding said hollow body arranged to actuate said gripping-fingers.

4. A coupling of the class described, comprising a hollow body having slots therein, grippers guided by said slots, movable axially with respect to said body, and cooperative with the walls of said slots to effect their relatively divergent movement, a ring embracing said grippers tending to maintain them in relatively parallel relation, and means operative to effect their longitudinal movement.

5. A coupling of the class described, comprising a body having slots therein, grippers mounted to move longitudinally in said slots, cooperative with the walls of said slots to effect their relatively divergent movement, means embracing said grippers tending to direct them in parallel relation, and a sleeve forming an outer casing for said body and grippers, and having helical grooves formed in its inner surface, cooperative with said fingers to effect their actuation.

6. A coupling of the class described, comprising grippers mounted to slide longitudinally, and having means arranged to engage a headed nipple, means tending to maintain said grippers in parallel relation, means arranged to effect the movement of said grippers toward and from each other, and a sleeve surrounding said grippers, and having helical guides with which said grippers cooperate to effect their movement.

7. A coupling of the class described comprising a ferrule having slots therein, a sleeve having helical grooves mounted to rotate on said ferrule, and grippers mounted to be moved longitudinally in said slots by direct cooperation with said grooves, and having inwardly directed humps arranged to engage a headed nipple, and outwardly directed humps cooperative with said sleeve to prevent their accidental separation.

8. A coupling of the class described, arranged to connect the nozzle of a spray-bottle valve with the nipple of a spray-bottle, and comprising a ferrule embracing said nozzle and having slots therein, a sleeve mounted to rotate about said ferrule, and having helical grooves therein, grippers mounted to slide longitudinally in said slots, cooperative with the ends of said slots to effect their movement with respect to each other, and having inwardly directed humps arranged to engage said nipple, outwardly directed humps cooperative with said sleeve to prevent their accidental separation, and projections extended into said helical grooves of said sleeve and cooperative therewith to effect their actuation, and means tending to maintain said grippers in parallel relation.

In witness whereof, I have hereunto set my hand this 15th day of September, A. D., 1921.

GEORGE D. HECK.